Patented July 20, 1937

UNITED STATES PATENT OFFICE 2,087,762

GLASS COMPOSITION FOR ELECTRIC GASEOUS DISCHARGE DEVICES

Hermann Krefft, Berlin-Friedrichshagen, Germany

No Drawing. Original application July 31, 1934, Serial No. 737,829. Divided and this application June 15, 1935, Serial No. 26,825. In Germany August 21, 1933

3 Claims. (Cl. 106—36.1)

The present invention relates to a glass composition which is useful generally, and in particular for the envelopes of gaseous electric discharge devices.

A particular object of the invention is to provide a novel glass which will resist blackening when subjected to an electric gaseous discharge. Another object of my invention is to provide a glass which will be suitable for the envelope of a high intensity mercury vapor arc lamp. Still other objects and advantages of the invention will appear from the following detailed specification.

The invention consists in a new and novel combination of elements, as hereinafter set forth and claimed.

In operating gaseous discharge devices such as the high pressure mercury vapor arc lamps with thermionic electrodes which are now coming into considerable use a blackening of the lamp envelope has been found to occur heretofore after a relatively short burning period. This rapid blackening of the envelope, which is caused in part by decomposition of the electrodes and in part by the influence of ultraviolet rays and electric particles, has tended to limit the useful life of these devices, and hence is undesirable.

I have now discovered that this undesired blackening of the mercury high pressure lamp is avoided if a small quantity, of the order of 0.2–5%, of caesium is mixed with the vaporizing mercury base body, provided that a special aluminum silicate glass is used in constructing the discharge vessel of the lamp. This special glass has 60% or less of silica, more than 20% alumina, and also contains small quantities of other glass builders such as boric oxide, magnesium oxide and calcium oxide. With a tube constructed in this manner, in addition to the mercury vapor, a small quantity of caesium vapor is also produced during operation of the lamp by vaporization of the base body. Although this caesium vapor, because of its small quantity, does not participate in the light radiation to any appreciable extent and therefore does not noticeably change the mercury radiation, nevertheless, in combination with the definite construction of the lamp vessel, it has the effect that the heretofore unavoidable blackening of the lamp vessel is eliminated.

The glass which I use for the envelopes of these discharge devices is preferably an aluminum silicate glass of special composition which I have discovered resists blackening. This glass contains silica of the order of 60% or less, and 20% or more of alumina, the remainder of said glass consisting of any suitable glass forming materials, such as boric oxide, magnesium oxide, and calcium oxide. Such a glass has an expansion coefficient of between 30 and $50 \times 10^{-7}$, and is likewise resistant to chemical attack by either mercury vapor or caesium vapor, even at temperatures considerably in excess of 300° C., so that no blackening of the envelope is produced by these vapors during operation of the lamp. A particularly effective glass composition has been found to be as follows:

| | Percent |
|---|---|
| $SiO_2$ | 57.6 |
| $B_2O_3$ | 1.2 |
| $Al_2O_3$ | 28.4 |
| MgO | 8.2 |
| CaO | 4.6 |

This glass has a softening temperature of approximately 750° C., so that a mercury vapor discharge at several atmospheres vapor pressure can be operated in a lamp constructed thereof without danger.

While I have described the use of the novel glass of my invention by reference to a lamp of particular construction, wherein all of the mercury is vaporized during operation, it is to be understood that it is likewise applicable to other high pressure lamps in which the metal is not all in the vapor phase. It is furthermore to be understood that my invention is not only useful in lamps containing mercury, but also in devices containing other vaporizable metals, such as cadmium, sodium, or the like, and particularly to devices operating at relatively high temperatures, of the order of 300° C. Various changes, substitutions and omissions, within the scope of the appended claims may, of course, be made in the composition described without departing from the spirit of my invention.

This application is a division of my co-pending application, Serial Number 737,829, filed July 31, 1934, Patent 2,056,926 issued October 6, 1936.

What I claim as new and desire to secure by Letters Patent of the United States is:—

1. A glass having a composition of the order of 60% of silica and more than 20% alumina, together with boric oxide, magnesium oxide and calcium oxide, said glass being free of alkali metal oxides.

2. A glass having a composition of substantially

| | Percent |
|---|---|
| $SiO_2$ | 57.6 |
| $Al_2O_3$ | 28.4 |
| $B_2O_3$ | 1.2 |
| MgO | 8.2 |
| CaO | 4.6 |

3. A glass having a composition of the order of 60% of silica and more than 20% alumina, together with other usual glass forming materials, said glass being free of alkali metal oxides.

HERMANN KREFFT.